June 6, 1961 L. J. GRAUEL ET AL 2,987,055
COMBUSTION AIR SUPPLY CONTROL FOR INTERNAL COMBUSTION ENGINES
Filed March 9, 1959
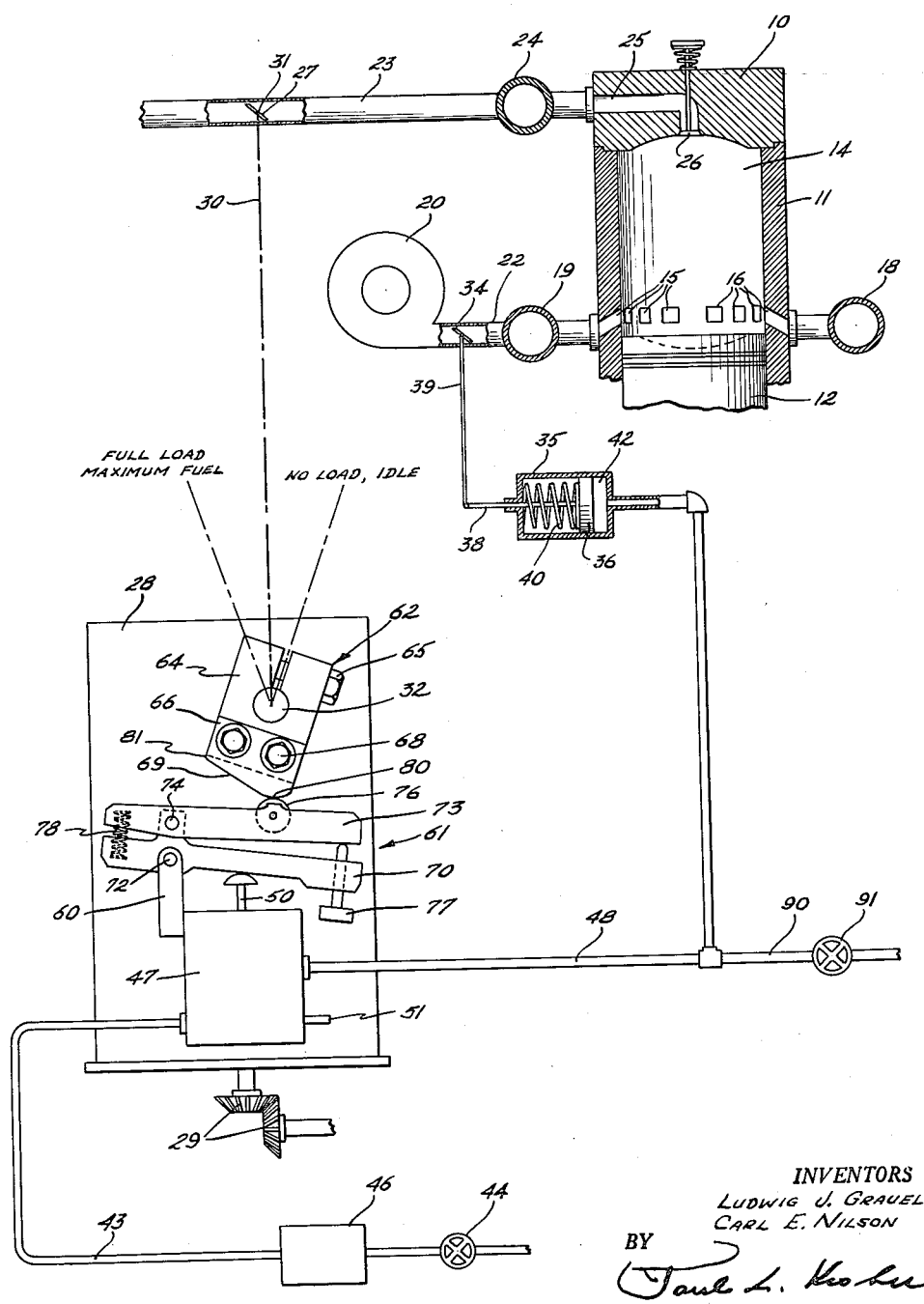
INVENTORS
LUDWIG J. GRAUEL
CARL E. NILSON
BY

United States Patent Office 2,987,055
Patented June 6, 1961

2,987,055
COMBUSTION AIR SUPPLY CONTROL FOR INTERNAL COMBUSTION ENGINES
Ludwig J. Grauel and Carl E. Nilson, Beloit, Wis., assignors to Fairbanks, Morse & Co., Chicago, Ill., a corporation of Illinois
Filed Mar. 9, 1959, Ser. No. 797,974
3 Claims. (Cl. 123—120)

This invention relates to improvements in internal combustion engines, and has particular reference to an improved control system for controlling and regulating engine supply of combustion air such as to secure improved fuel combustion with attendant increase in engine operating efficiency.

As is well known in the internal combustion engine art, the attainment of practical optimum fuel combustion is dependent in great part, upon the relative proportions of fuel and air in the engine cylinders. Proper proportioning of air to fuel is of particular importance to effective and efficient engine operation on gas fuels, as methane and butane for example, due to the critical ignition and burning characteristics of such fuels. The supply of air in material excess of the volume required for effective combustion of a given volume of gas fuel, results in lean mixtures usually difficult to ignite and which undergo incomplete combustion with consequent loss of engine power output. On the other hand, among the disadvantages of an insufficient supply of air are fuel detonation and, again, incomplete gas fuel combustion. Moreover, in effecting proper proportioning of air supply to the fuel in cylinder supply, such proportioning must also account for the B.t.u. heat characteristics of the particular fuel employed, and such factors as the temperature, barometric pressure and density of the combustion air.

Accordingly, the primary object of the present invention is to afford engine supply of combustion air in controlled volume or quantity such as will assure effective fuel combustion under all operating conditions of the engine.

Another object is to afford combustion air control in an internal combustion engine, by automatic regulation of the volumetric delivery of combustion air to the engine as a function of engine loading.

Another object of the present invention is to provide relatively simple yet highly effective combustion air control means for accomplishing the aforesaid objects, which includes an effective provision permitting adjustments of the control to care for variations in temperature, barometric pressure and density of the air in supply to the engine.

A further object is to afford combustion air control means as aforesaid, which may be readily and easily applied to existing engines in the field.

The foregoing and other objects and advantages of the present invention will appear from the following description of a presently preferred means for combustion air control, as such is illustrated by the accompanying drawing the single figure of which presents the preferred means partly in diagrammatic or schematic form.

The present invention is suitable for application to single or multi-cylinder engines generally, adapted for operation on one or more fuels, as selectively for example, on oil fuel and a suitable gas fuel. However and for the reasons hereinbefore noted, it is especially advantageous in connection with engines operating on gas fuels, as methane, butane and the like. Accordingly, the present combustion air control is herein described by way of example, in association with a gas engine.

With reference to the schematic showing in the drawing, a gas engine cylinder assembly is illustrated in fragmentary part as including a cylinder head 10, cylinder 11 and piston 12 reciprocable therein, these parts defining the cylinder combustion space 14. In the present example, the cylinder 11 is provided with piston-controlled air ports 15 and exhaust ports 16, the latter leading to an exhaust discharge manifold indicated at 18. The air ports 15 communicate with air supply manifold indicated at 19, the manifold being supplied with scavenging and combustion air under pressure from a suitable blower or compressor 20, through supply conduit 22. Although not here shown, the compressor 20 may be driven from the associated engine, or separately driven as desired.

Engine supply of gas fuel from a suitable source (not shown), is effected through conduit 23 to gas header 24 and thence to passage 25 in cylinder head 10, such passage opening to the cylinder combustion space 14 under control of a suitable intake valve 26. In conduit 23 is a gas throttle valve 27 for regulating gas fuel quantity delivery to the engine. The throttle valve is operated by an engine driven governor 28 of suitable type, the operating connection being indicated by the broken line 30 between the valve shaft 31 and the output member or shaft 32 of the governor. Engine drive of the governor may be effected as through the gearing indicated at 29. For fuel ignition, suitable ignition means such as a spark plug or the like (not shown), is provided in the cylinder assembly.

As is usual in engines according to the present example, the normal operating capacity of the compressor is such that, without volumetric delivery control, the air supplied to the engine over its operating range, and especially at idle and low loads, is in excess of requirements for optimum fuel combustion. Therefore, and since the fuel-air ratio is important and generally critical to ignition and combustion of gas fuel in the combustion space, control of the volumetric supply of combustion air delivery to the engine is here afforded in an improved and efffective manner now to be described.

Operatively mounted in the air conduit 22 is an air throttle valve 34 for regulating, according to its throttling position therein, the volumetric pressure air supply from the compressor 20 to the air manifold, and hence to the air ports 15 of the cylinder for admission to the combustion space 14. Positional operation of valve 34 is by a fluid-pressure operated servomotor 35 providing a piston 36 having its rod 38 connected by link 39 to the valve. The piston is normally urged or biased in one direction by a spring 40, the bias direction here being such as to produce opening displacement of the valve, as toward and to a desired terminal open position which may be determined by a valve stop (not shown). Valve displacement in the closing direction is the result of fluid pressure admitted to the servomotor cylinder space 42 and acting to displace the piston 36 in opposition to spring 40, with the extent of piston movement and, hence, of valve closing, variable in dependence upon the pressure of fluid applied to the servomotor.

Pressure fluid for servomotor operation may be provided, advantageously, from the usual engine starting air source (not shown) over an air supply conduit line 43 having therein a manual shut-off valve 44 and pressure reducer device 46. Line 43 leads to the input of a pressure reducer controller 47 having its output connected by conduit line 48 to the servomotor cylinder space 42. Controller 47 may be and preferably is a well known and readily available device which operates in accordance with positionment of its control element 50, to determine the pressure of fluid in its output line 48. Actuation of the control element 50 is here effected through the engine governor 28, by camming means presently to be described.

For venting line 48 upon controller decrease of fluid pressure therein, the controller includes the vent 51 for such purpose. In the present control example, the pressure reducer 46 is set to reduce the compressed air supply (which for engine starting purposes, is usually under supply pressure of about 250 p.s.i.g.) to a pressure of, say, 125 p.s.i.g. in the line 43. Thus the control instrument 47 is selected as to its pressure-reducing range from such input pressure, to attain a desired output range presently to appear.

The controller 47 is suitably mounted on the governor 28 below governor shaft 32, and provides a bracket 60 for the support of a cam follower device generally indicated at 61, extending between the control element 50 of the controller and a cam unit 62 fixed on governor output shaft 32. Cam 62 comprises a bracket 64 adjustably clamped to governor shaft 32 as by clamp screw 65, and a cam element 66 removably carried by the bracket through mounting screws 68, the cam element presenting a cam margin or edge 69 of predetermined contour. The follower device 61 comprises a first lever arm 70 pivoted at 72 on bracket 60 and engaging the controller element 50, and a second lever arm 73 pivoted at 74 on lever arm 70 and supporting a roller 76 in contact with cam edge 69. For a purpose to appear, the follower is adjustable to vary its effective length between the control element 50 and governor cam 62. To such end, a set screw 77 is carried at the forward end of lever arm 70 in extension to engagement with lever arm 73, while a suitable compression spring 78 bears between the rear ends of the lever arms for maintaining contact of arm 73 against the set screw. By turning the set screw in one direction or the other, the lever arms 70 and 73 may be relatively angularly displaced toward or away from one another, thus producing corresponding change in the effective length of the cam follower. For clear understanding as to what is meant by the effective length of the follower, such length is the distance between a line tangent to the periphery of roller 76 at the point thereof in contact with cam element 66, and a line parallel to such tangent line and passing through the point of contact between arm 70 and controller element 50.

In the present example, the controller 47 is selected to have an effective range of control through displacement of its control element 50, such that with an input air pressure of approximately 125 p.s.i.g., the output air pressure in line 48 may be varied in a range of about 12 to 97 p.s.i.g. This range is of advantage to assure positive servomotor operation of the combustion air throttle valve with great sensitivity to even small engine load variations. The servomotor 35 is adapted to such air pressure range, and is effective to produce closure or a predetermined minimum open condition of the throttle valve 34 at about 97 p.s.i.g. air pressure in servomotor cylinder 42, and maximum open condition of the throttle valve through the action of the servomotor spring 40, when the air pressure in the servomotor cylinder 42 is at or less than about 12 p.s.i.g.

With the cam follower 61 adjusted by set screw 77 to an intermediate adjustment condition, the cam unit 62 is angularly set on governor shaft 32 (through clamp 65) so that in the no-load idle operation of the engine, the nose or high point region 80 of the cam edge 69 will be in contact with follower roller 76, thereby positioning the follower to depress the controller element 50 for establishing an output air pressure in line 48 which, for present example, may be about 90 p.s.i.g. In this condition, the servomotor responds to locate the air throttle valve 34 near minimum open position, determining air supply to the engine in restricted volume sufficient to assure fuel ignition and combustion under the no-load idle state of the engine (wherein the governor sets the gas throttle 27 in minimal or idle open position). Now with increase in engine loading up to full load, the governor responds to effect through its output shaft 32, corresponding full open positioning of the gas throttle 27 and angular displacement of cam unit 62 such as to dispose a low point 81 of the cam edge 69 opposite the follower roller 76. Since in the controller unit 47, the control element 50 thereof is under upward bias (as by suitable spring or other means embodied in the unit but not here shown), the control element 50 then assumes a position of upward displacement to the limit of follower roller contact on low point 81 of the cam. This conditions the controller to determine air pressure in line 48 (say for present example) about 20 p.s.i.g. The servomotor then responds (through spring 40) to locate air throttle valve 34 in near full open position such as to determine engine air supply in sufficient volume for optimum fuel combustion at full load. At any given intermediate loading of the engine, the governor locates gas throttle 27 to set fuel delivery for such load, and coincidentally disposes cam unit 62 in a corresponding intermediate position. The latter conditions the controller 47 to determine such air pressure in line 48 (between the indicated 20 and 90 p.s.i.g.) as will produce servomotor operation to dispose air throttle valve 34 in a part-open position allowing only that volumetric supply of air necessary to attain the desired optimum fuel combustion under the then applicable engine load.

By preference, the engine governor 28 is of a well known and commercially available load settable type. It includes an adjustment control (not shown) by which it may be set selectively, for engine operation at no-load idle, full load or any one of a number of intermediate loads which may include ¼, ½ and ¾ loads. In each such setting, the governor output shaft 32 will assume a corresponding angular position, operating the gas valve 27 to a position controlling gas fuel supply to a quantity necessary for engine operation under the set load. Fluctuations in engine speed will, of course, provide governor action to adjust the gas valve for restoring the engine speed to the then applied load for which the governor is set. For corresponding combustion air control, then, the cam element 66 of cam unit 62 is formed to have a camming surface or edge 69 of a contour predetermined in relation to a given engine installation, the cam contour being determined with regard to normal engine operation at each load setting of the governor, in each case under like conditions as to gas fuel B.t.u. value and the temperature, barometric pressure and density of the air entering the intake of blower 20, so as to obtain substantially optimum fuel-air ratios over the load range of the engine. Thus, the cam in each angular position thereof according to the load setting of the governor, acts through the follower 61 (then in an intermediate adjusted condition) to operate controller element 50 to an extent determined by cam formation, such as to determine the air pressure in line 48 at a value sufficient to cause servomotor operation to so position air throttle valve 34 as to determine engine air delivery in that quantity necessary for ready fuel ignition and optimum, non-detonating fuel combustion. As has been found in practice of the present invention, the cam as contoured in adaptation to a given engine, normally does not afford a camming surface of uniform variation between the high and low points thereof. Consequently, cam control of servomotor operation to locate the air throttle valve with change in engine loading, will result not in a linear relation of throttle valve position to cam position, but in an irregular relationship thereof attaining according to cam position at each load setting of the governor, correct positioning of the air throttle valve to assure the proper fuel-air ratio for optimum fuel combustion under the then existing load operation of the engine.

Since, as often is the case, the operating characteristics of one engine differ in some more or less appreciable degree from the operating characteristics of another of like form and capacity, for best results the cam 66 should and normally must be tailored as to its cam contour, to each given engine. This is especially true, of course, where the cam control of the present invention is applied to engines of different types and capacities, as for example, to opposed piston engines and single piston per cylinder engines. Accordingly, the cam 66 is here made as a separate piece in removable attachment to cam arm 64. Thus, in the event the governor assembly including the air control provisions, is removed from one engine and utilized on another engine, a new cam element contoured for effective operation in respect to the latter engine, may be readily applied in place of the cam tailored to the engine from which the governor assembly was removed. On the other hand, if in a given engine installation of the cam control here afforded, it should become necessary to materially change the effect of the cam, as because of a change in the type of fuel used or for any other reason, the old cam may be readily replaced by a new one contoured to suit the change in engine conditions.

An important feature of the present invention resides in the adjustability of the cam follower 61. As hereinbefore noted, in tailoring the cam 66 to a given engine installation for securing the described control effect thereof over the load range of the engine, such was obtained on the basis of an intermediate adjustment setting of the follower. Now, by turning the adjustment screw 77 in one or the other direction, it will appear that the effective length (hereinbefore defined) of the follower between control element 50 and the cam 66, may be correspondingly increased or decreased. Such adjustability is here utilized to attain a fine or vernier regulation of the air throttle operating mechanism, and to that end suitable stop means (not shown) may be associated with the follower lever arms 70 and 73 to limit the extent of effective length change by the screw 77. The result of screw adjustment to produce an increase in the effective length of the follower, is to shift the control range of controller 47 from the heretofore indicated range of 20 to 90 p.s.i.g. in the air pressure line 48 to the servomotor 35, to a range having lower terminal values, as for example, to a range of 12 to 80 p.s.i.g. at maximum length adjustment in the length increasing direction. Air throttle valve positioning in response to cam action, then will be correspondingly altered throughout the range and such that at the terminal pressures under maximum adjustment, for example, the air valve will be respectively at full open position and closed to a lesser extent than obtains in the before described intermediate range. Follower adjustment to decrease its effective length, will produce an opposite effect, as to shift the controller range to one of higher terminal values. With length adjustment to a maximum in this direction, the new range may be between 28 and 97 p.s.i.g., with consequent alteration in cam determined positioning of the air throttle valve. For example, at the terminal pressures under such adjustment, the air valve will be respectively at appreciably less than full open position and at substantially closed position.

The vernier adjustment afforded by the follower 61, permits fine or incremental adjustments to be made in the combustion air control function of the present mechanism, as to care for deviations in certain operating factors affecting normal engine operation. Thus, in respect of such factors as an appreciable change in the B.t.u. heat value of the gas fuel, or changes in temperature, barometric pressure or density of the ambient air in supply to the engine blower, variations therein as may occur from time to time, may be accommodated through proper adjustments of the follower. It is to be noted that such vernier adjustments may be made while the engine is in operation, so that as deviations appear, the engine may be quickly retored to normal operation.

Where the engine to which the present combustion air control is applied, is of dual fuel character operable on oil fuel, as a diesel engine, or on gas fuel, it is usual practice to start such engines on oil fuel and then convert to gas fuel operation. During starting and initial operation on oil fuel, it is desirable to afford full blower air supply to the engine, which thus requires the air throttle valve 34 to be located and retained in its maximum open position, free of the control provision. This may be attained, conveniently, by an air by-pass line 90 extending from the servomotor pressure air line 48 to a desired point of discharge, with the by-pass under control of a suitable valve 91. The valve 91 may be of directly manually operated type, or a solenoid valve remotely controlled as from the engine control station. In either case, opening of the valve will exhaust the pressure air from line 48, thus permitting the servomotor through its spring 40, to dispose and hold the air throttle valve 34 in maximum open position, as for engine starting. Once the engine is started and coincidentally with conversion thereof to gas operation, the valve 91 is closed which thus restores the air throttle valve 34 to positional control by the present control provision.

Having now described and illustrated a presently preferred embodiment of the invention, it is to be understood that contemplated herein are all variations and modifications in and to the disclosed embodiment which come within the spirit and scope of the invention as hereinafter defined.

What is claimed is:

1. In an internal combustion engine having separate, controllable fuel and combustion air supply means, an engine operated governor in control of the fuel supply means, and regulatable means including a regulating element, for controlling the combustion air supply means; mechanism for actuating said regulating element coincidentally with control of the fuel supply means by the governor, comprising a governor operated cam, a cam follower having a variable effective length between the cam and said regulating element, said cam follower comprising pivotally interconnected relatively separable lever arms, the extent of relative separation thereof determining the effective length of the follower, and means operable to determine the extent of relative separation of said lever arms for varying the effective length of the follower.

2. In an internal combustion engine having separate, controllable fuel and combustion air supply means, an engine operated governor in control of the fuel supply means, and regulatable means including a regulating element, for controlling the combustion air supply means; mechanism for actuating said regulating element coincidentally with governor operation to control the fuel supply means, said mechanism comprising a governor operated cam and a cam follower affording a variable effective operating length between the cam and said regulating element, said follower comprising an interconnected pair of lever arms extending between the cam and regulating element in adjustably spaced apart relation determining the effective operating length of the follower, and means including an adjusting element operable to vary the relative spacing of the lever arms, provided for retaining the lever arms in adjusted spaced apart relation.

3. In an internal combustion engine having separate, controllable fuel and combustion air supply means, an engine operated governor in control of the fuel supply means, and regulatable means including a control device adjacent the governor and having a regulating element, provided for controlling the combustion air supply means; mechanism for actuating said regulating element coincidentally with governor operation in controlling the fuel supply means, comprising a governor operated cam spaced from said regulating element, and a cam follower affording a variable effective operating length between the cam and regulating element, said follower comprising a first lever arm, means pivotally supporting said first lever arm, a second lever arm pivotally carried by the first lever arm, said lever arms extending between the cam and regulating element in adjustably spaced apart relation determining the effective operating length of the follower, and means including an adjusting element operable to vary the relative spacing of the lever arms, provided for retaining the lever arms in adjusted spaced apart relation.

References Cited in the file of this patent

UNITED STATES PATENTS

| | | |
|---|---|---|
| 1,962,283 | Nordberg | June 12, 1934 |
| 2,165,176 | Fodor | July 4, 1939 |
| 2,193,927 | Jivkovitch | Mar. 19, 1940 |
| 2,330,866 | Camner | Oct. 5, 1943 |
| 2,865,164 | Kauffman | Dec. 23, 1958 |
| 2,882,880 | Reggio | Apr. 21, 1959 |

FOREIGN PATENTS

| | | |
|---|---|---|
| 815,873 | France | Apr. 19, 1937 |